(12) United States Patent
Uehira et al.

(10) Patent No.: US 8,425,222 B2
(45) Date of Patent: Apr. 23, 2013

(54) DIE ASSEMBLY FOR INJECTION MOLDING

(75) Inventors: Masayoshi Uehira, Osaka (JP); Akihiro Iwane, Mizuho-machi (JP); Akihiko Matsumoto, Toyokawa (JP); Takahito Muroi, Akishima (JP)

(73) Assignee: Konica Minolta Opto, Inc., Tokyo (JP)

( * ) Notice: Subject to any disclaimer, the term of this patent is extended or adjusted under 35 U.S.C. 154(b) by 74 days.

(21) Appl. No.: 13/202,764

(22) PCT Filed: Feb. 4, 2010

(86) PCT No.: PCT/JP2010/051604
§ 371 (c)(1),
(2), (4) Date: Aug. 22, 2011

(87) PCT Pub. No.: WO2010/098188
PCT Pub. Date: Sep. 2, 2010

(65) Prior Publication Data
US 2012/0040044 A1    Feb. 16, 2012

(30) Foreign Application Priority Data
Feb. 25, 2009   (JP) ................................ 2009-041873

(51) Int. Cl.
*B29C 45/33* (2006.01)

(52) U.S. Cl.
USPC .......................... 425/572; 425/575; 425/808

(58) Field of Classification Search ................. 425/555, 425/572, 574, 575, 808
See application file for complete search history.

(56) References Cited

U.S. PATENT DOCUMENTS

| 2,443,826 | A | * | 6/1948 | Johnson ........................ 425/808 |
| 6,141,991 | A | * | 11/2000 | Fujimoto et al. ............. 425/808 |
| 6,355,190 | B1 | * | 3/2002 | Ojio et al. ..................... 425/808 |

FOREIGN PATENT DOCUMENTS

| JP | 6-47745 | 2/1994 |
| JP | 7-329119 | 12/1995 |
| JP | 2003-231159 | 8/2003 |
| JP | 2006-327006 | 7/2006 |
| JP | 2006-321168 | 11/2006 |

* cited by examiner

*Primary Examiner* — Tim Heitbrink
(74) *Attorney, Agent, or Firm* — Cozen O'Connor (57) ABSTRACT

Taper portions 151 and 161 are provided in the cavity of a stationary side die 110 and the cavity of a movable side die 120 in an injection molding apparatus, respectively, and a floating mechanism 170 is provided so that one taper portions are able to freely follows the other taper portions while die clamping. This configuration makes it possible to correct axial misalignment in each of the cavities.

7 Claims, 5 Drawing Sheets

DIE ASSEMBLY FOR INJECTION MOLDING

RELATED APPLICATIONS

This is a U.S. National Phase Application under 35 USC 371 of International Application PCT/JP2010/051604 filed on Feb. 4, 2010.

This application claims priority of Japanese Application No. JP2009-041873 filed on Feb. 25, 2009, the entire content of which is hereby incorporated by reference.

TECHNICAL FIELD

The present invention relates to die assemblies for injection molding and in particular to the die assembly for injection molding an optical element.

BACKGROUND ART

Known is an injection molding apparatus in which components are molded by injecting resin into a cavity, which is a space formed between a stationary side die and a movable side die.

In the process of molding an optical element, a positional misalignment between the stationary side die and the movable side die leads directly to a shape error of a product. Here, taking the case of a lens as an example, the above-mentioned positional misalignment corresponds to a misalignment of axes in the case where there is a misalignment between the central axes of the optically functional surfaces of the lens molded with a stationary side die and a movable side die, or the optical axes of the lens are tilted (intersect each other).

In order to prevent or stabilize such an axial misalignment, there is proposed a configuration in which the contact faces between the stationary side die and the movable side die is made to have taper shapes, and when the dies are clamped, the dies are made to follow the abovementioned taper shapes, thereby controlling the axial misalignment (for example, patent documents 1 and 2).

RELATED ART DOCUMENT

Patent Document

Patent document 1: Japanese Laid-Open Patent Application Publication No. 2003-231159
Patent document 2: Japanese Laid-Open Patent Application Publication No. 2006-327006

SUMMARY OF THE INVENTION

Object of the Invention

However, in the conventional configuration, in which taper shapes are provided, there is no measure to facilitate the dies to smoothly follow the taper shapes. Therefore, if there is a large axial misalignment between the stationary side die and the movable side die, the respective taper shapes do not conform to each other, and the clamp is performed with the taper shapes being tilted and with the stationary side die and the movable side die distorted. With the result, there is caused a problem that the tapered portion is unevenly worn and this uneven wear increases the axial misalignment.

In particular, when an optical element is molded, the tilt between the stationary side die and the movable side die leads to the tilt of the optical axis, and the optical performances are accordingly greatly affected. Further, in the case of precise components including optical elements, the amount of positional misalignment or axial misalignment needs to be smaller than reproducibility in clamping of the injection molding apparatus.

In addition, regarding the conventional dies, a plurality of cavities are formed in the dies to allow a plurality of components to be molded. However, the axial misalignment is not adjusted for all those cavities. Therefore, respective component molded may be different in characteristics.

The present invention has been conceived to solve the above-mentioned problems, and an object of the present invention is to provide an injection die assembly which makes the axial misalignment between the stationary side die and the movable side die smaller than ever before.

Means for Solving the Object

In order to achieve the object, the present invention is configured as follows.

That is, according to one embodiment of the present invention, a die assembly for injection molding which is configured to relatively move a first die and a second die in an open/close direction so as to form a plurality of cavities and mold a component in each cavity, the die assembly comprising:

a pair of a first cavity-forming member and a second cavity-forming member which are configured to form each of the cavities; and a floating mechanism provided on at least one of the first die and the second die, wherein the first cavity-forming member is disposed in the first die to form one side of the cavity;

a second cavity-forming member is disposed in the second die to form the other side of the cavity;

the first cavity-forming member and the second cavity-forming member each have a taper portion, the taper portions configured to be engaged with each other when die clamping of the first die and the second die is performed;

a die which is one of the first die and the second die and which has the floating mechanism is a floating-mechanism-equipped die;

a cavity-forming member which is one of the first cavity-forming member and the second cavity-forming member and which is disposed in the floating-mechanism-equipped die is a movable cavity-forming member; and the floating mechanism causes the movable cavity-forming member disposed in the floating-mechanism-equipped die to move such that the movable cavity-forming member follows an engagement of the taper portions when the die clamping is performed.

The above-mentioned floating-mechanism-equipped die may include:

a storage section configured to store the movable cavity-forming member to be movable in the open/close direction and in a perpendicular direction which is perpendicular to the open/close direction; and a support member configured to support the movable cavity-forming member in the storage section to be in a movable state.

The above-mentioned support member may be a bias member configured to bias the movable cavity-forming member in the open/close direction.

The above-mentioned floating-mechanism-equipped die may further include a dropout prevention member configured to prevent the movable cavity-forming member from dropping off from the storage section.

The above-mentioned first die may be either one of a stationary side die and a movable side die, the second die is the other one of the stationary side die and the movable side die, and only the stationary side die has the floating mechanism and the movable cavity-forming member.

The above-mentioned component molded in the cavity may be a lens.

ADVANTAGE OF THE INVENTION

According to a die assembly for injection molding of an embodiment according to the present invention, the floating mechanism, at the time of the clamping of the first die and the second die, allows at least one of the first die and the second die to move following the engagement of the tapered portions. Thus, with the above-mentioned die assembly for injection molding, the axial misalignment between the stationary side die and the movable side die is corrected for each cavity, and the axial misalignment is reduced, that is, the accuracy of axial misalignment is improved.

In addition, the floating mechanism allows at least either of the first cavity-forming member and the second cavity-forming member to move while following the engagement of the first cavity-forming member and the second cavity-forming member for forming each cavity. This arrangement improves the reproducibility of the axial misalignment for every die clamping.

In addition, since the tapered portions and the floating mechanism are provided, the axial misalignment is automatically corrected, for every die clamping, in the first cavity-forming member and the second cavity-forming member for forming each cavity. Therefore, there is almost no need for conventional processes for correcting the axial misalignment.

The storage section provided in the die and the support member constitute the floating mechanism, a bias member is used as the support member, and the dropout prevention member is provided. This arrangement makes the axial misalignment smaller than before with a simple configuration.

In addition, the movable cavity-forming member and the floating mechanism are provided on the stationary side die. This arrangement simplifies the configuration of the assembly and further reduces the generation of distortion.

In the case that optical components including lenses are molded, the axial misalignments in the molded components are decreased, and the optical characteristics are thus prevented from being adversely affected.

BEST MODE FOR CARRYING OUT THE INVENTION

A die assembly for injection molding of an embodiment according to the present invention will be described below with reference to the drawings. In the drawings, same or similar parts of the configuration are assigned the same reference numerals.

Figure 1:
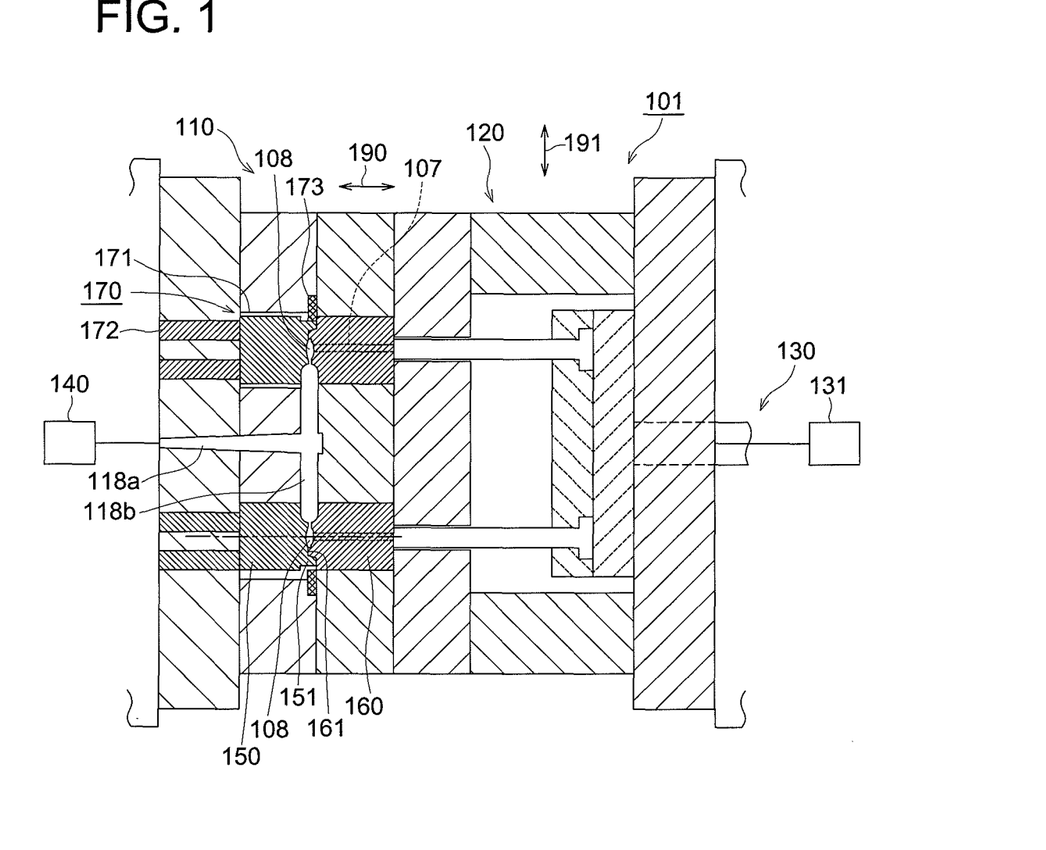
FIG. 1 is a diagram showing a configuration of a die assembly for injection molding of an embodiment according to the present invention.

FIG. 1 shows a structural example of a die assembly for injection molding 101 of an embodiment. The die assembly for injection molding 101 has functions of what is called an injection molding apparatus, and is provided, to achieve the functions, with a first die 110, a second die 120, a die drive mechanism 130, and a material injection section 140.

In the die assembly for injection molding 101, the first die 110 functions as a stationary side die, the second die 120 functions as a movable side die, a drive section 131 provided on a die drive mechanism 130 moves the second die 120 in an open/close direction 190, and a material injection section 140 is connected with the first die 110.

In addition, in the first die 110 there are provide a sprue 118a and a runner 118b which come from the material injection section 140 and reach a cavity 108 and through which injection material passes, and in the second die 120 there is provided a runner 118b. The cavity 108 is a space in which a component is molded, and in the die assembly for injection mold 101 there are formed a plurality of cavities 108. In the second die 120 there is provided a component taking-out mechanism including an ejector pin 107 for pushing out a molded component from the cavity 108 after the component is injection molded and the first die 110 and the second die 120 are released.

However, without being restricted to the above-described configuration of the die assembly for injection molding 101, the die assembly for injection molding may have the following configuration and arrangement: the first die 110 is the movable side die; the second die 120 is the stationary side die; and in accordance with this arrangement, the die drive mechanism 130 and the material injection section 140 are structured and arranged.

In the case of the die assembly for injection molding, components formed in the cavities 108 are optical components including lenses. In the case of a lens as a molded component, the cavity 108 has a diameter of 7 to 8 mm as a practical example. Of course, the molded components are not restricted to the above-mentioned optical components.

The die assembly for injection molding 101 has, in addition to the above-mentioned basic structural components, first cavity-forming members 150, second cavity-forming members 160, and floating mechanisms 170, as one of the typical structural portions. These are described below in details.

The die assembly for injection molding 101 has a plurality of cavities 108 as described above. The first cavity-forming member 150 and the second cavity-forming member 160 are a pair of components for forming each of the cavities 108. That is, the first cavity-forming member 150 is disposed in the first die 110 and forms one side 108a of the cavity 108 (see FIG. 2), in other words, one half side of a mold component to be molded in the cavity 108. The second cavity-forming member 160 is disposed in the second die 120, facing the first cavity-forming member 150, and forms the other side 108b of the cavity 108 (see FIG. 2), in other words, the other half side of the component to be molded.

In addition, the first cavity-forming member 150 and the second cavity-forming member 160 have taper portions one for each, which taper portions engage with each other when the first die 110 and the second die 120 are clamped. That is, the first cavity-forming member 150 has taper portions 151 for constituting the one side 108a, and the second cavity-forming member 160 has taper portions 161 for constituting the other side 108b. The taper portion 151 has a taper surface 152 (see FIG. 2) corresponding to the side surface of the one side 108a, and the taper portion 161 has a taper surface 162 (see FIG. 2). The taper surface 152 and the taper surface 162 intersect each other, having the same tilt angle with respect to an open/close direction 190. Therefore, at the time of die clamping, the taper surfaces 152 and the taper surfaces 162 slide on each other, with the taper surfaces 152 and 162 being in contacts with each other.

In this embodiment, as illustrated in the drawing, the taper surface 152 of the taper portion 151 has recessed side surfaces, and the taper surface 162 of the taper portion 161 has protruded side surfaces, where the taper portion 161 is fit in the taper portion 151. However, the relationship between the taper portions may be reversed to that of this embodiment.

Next, the floating mechanism 170 will be described.

Specific components of the floating mechanism 170 will be described below. When a die which is one of the first die 110 and the second die 120 and has the floating mechanism is defined to be a "floating-mechanism-equipped die", the first die 110 corresponds to the above-mentioned "floating-mechanism-equipped die" of this embodiment, since the first die 110 is equipped with the floating mechanism 170 as shown in FIG. 1. In addition, when a cavity-forming member which is one of the first cavity-forming member 150 and the second cavity-forming member 160 and is disposed in the above-mentioned floating-mechanism-equipped die is defined to be a "movable cavity-forming member", the first cavity-forming member 150 disposed in the first die 110 corresponds to the above-mentioned "movable cavity-forming member" of this embodiment since the first die 110 corresponds to the above-mentioned floating-mechanism-equipped die.

In the floating mechanism 170 of the configuration of this embodiment, the first cavity-forming member 150, which corresponds to the above-mentioned movable cavity-forming member and is disposed in the first die 110 corresponding to the above-mentioned floating-mechanism-equipped die, is made to move following the engagement of the taper portions 151 and 161 when the first die 110 and the second die 120 are clamped.

Alternatively, the floating mechanism can be provided on the second die 120 instead of the first die 110. In this case, the second die 120 corresponds to the above-mentioned floating-mechanism-equipped die, the second cavity-forming member 160 corresponds to the above-mentioned movable cavity-forming member, and the floating mechanism 170 thus allows the second cavity-forming member 160 to move following the engagement of the taper portions 151 and 161.

Figure 5:
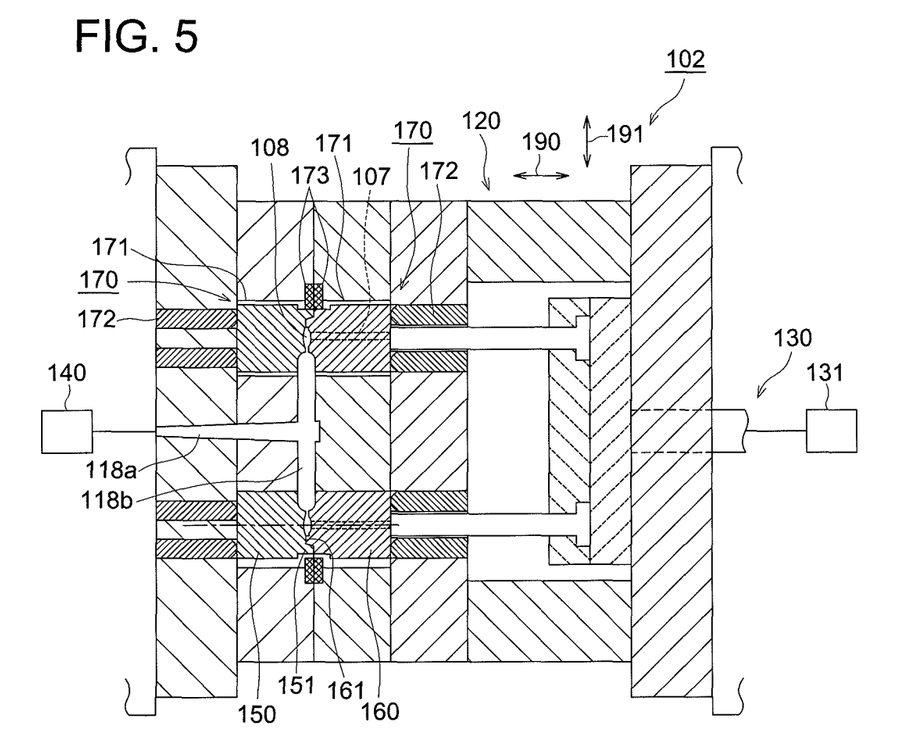
FIG. 5 is a diagram showing a die assembly for injection molding of another embodiment according to the present invention.

In addition, the floating mechanisms 170 can be provided on both of the first die 110 and the second die 120. In this case, the first die 110 and the second die 120 correspond to the above-mentioned floating-mechanism-equipped die, the first cavity-forming member 150 and the second cavity-forming member 160 correspond to the above-mentioned movable cavity-forming member, and the floating mechanisms 170 thus allows both of the first cavity-forming member 150 and the second cavity-forming member 160 to move following the engagement of the taper portions 151 and 161. FIG. 5 shows an injection die assembly 102 of another embodiment, in which die assembly the first die 110 and the second die 12 are both provided with the floating mechanisms 170, The floating mechanism 170 will be described in details.

The floating mechanism 170 has a storage section 171 and a support members 172, and thus allows the first cavity-forming member 150 to move following the engagement of the taper portions 151 and 161. Since the first die 110 corresponds to the above-mentioned floating-mechanism-equipped die as mentioned above in this embodiment, the first die 110 has the floating mechanisms 170. In other words, the first die 110 has the storage sections 171 and the support members 172.

The storage section 171 is a hollow portion which houses the first cavity-forming member 150, which corresponds to the above-mentioned movable cavity-forming member of this embodiment, to be movable in the open/close direction 190 and a perpendicular direction 191, which is perpendicular to the open/close direction 190. The gap between the inner surface of the storage section 171 and the first cavity-forming member 150 is about several tens microns as a practical example. The above-mentioned gap can be determined depending on a processing accuracy of the storage section 171 or the like.

On the other hand, since the second die 120 is not the above-mentioned "floating-mechanism-equipped die", the second die does not have the floating mechanism 170. Therefore, the second die 120 does not have the storage section 171. Thus, the second cavity-forming member 160 is tightly fit in the second die 120 with only the taper portion 161 protruded from the contact surface 121 (see FIG. 2), and does not move in the open/close direction 190 or the perpendicular direction 191. In addition, the contact surface 121 of the second die 120 is a surface at which the second die 120 is brought into contact with the first die 110.

The support members 172 are member which support the above-mentioned movable cavity-forming member, that is, the first cavity-forming member 150 in this embodiment, to be movable in the storage section 171, and in particular can be specifically configured with bias members for biasing the first cavity-forming member 150 in the open/close direction 190. As the bias member, what is called a ball plunger or a spring can be used.

In addition, it is preferable that a plurality of support members 172 are evenly provided for each first cavity-forming member 150 so as to support the first cavity-forming member 150 in the storage section 171 evenly and substantially in the open/close direction 190. This embodiment employs the above-mentioned ball plunger as the support member 172. This arrangement is preferable because the first cavity-forming member 150 and the support members 172 make point contacts to each other at ball sections, and the friction is thus low, and the first cavity-forming member 150 moves smoothly particularly in the perpendicular direction 191 in the storage section 171.

In connection with the installation of the support members 172, a dropout prevention members 173 are provided in the first die 110 so as to prevent the above-mentioned movable cavity-forming member, that is, the first cavity-forming member 150 in this embodiment from dropping out.

The dropout prevention member 173 is, for example, a rectangular solid plate, is a member protruding from the circumference of the storage section 171 of the first die 110 into the inside of the storage section 171, and is buried in the first die 110 so as not to disturb the clamping of the first die 110 and the second die 120. In addition, a plurality of dropout prevention members 173 are preferably provided at diagonal positions of the first cavity forming member 150 so that the first cavity-forming member 150 is set in a position where the axial direction of the first cavity-forming member 150 conforms to the open/close direction 190 when the above-mentioned movable cavity-forming member, that is, the first cavity-forming member 150 in this embodiment, comes into contact with the dropout prevention members 173. In addition, when the first cavity-forming member 150 comes in contact with the dropout members 173, the taper portion 151 of the first cavity-forming member 150 is protruded from a contact surface 111 of the first die member 110.

The operation of the die assembly for injection molding 101 will be described with reference to FIG. 2 to FIG. 4. However, the material injection section 140, the sprue 118a and the runner 118b coming from the material injection section 140 to the cavity 108 are omitted in FIG. 2 to FIG. 4.

Figure 2:
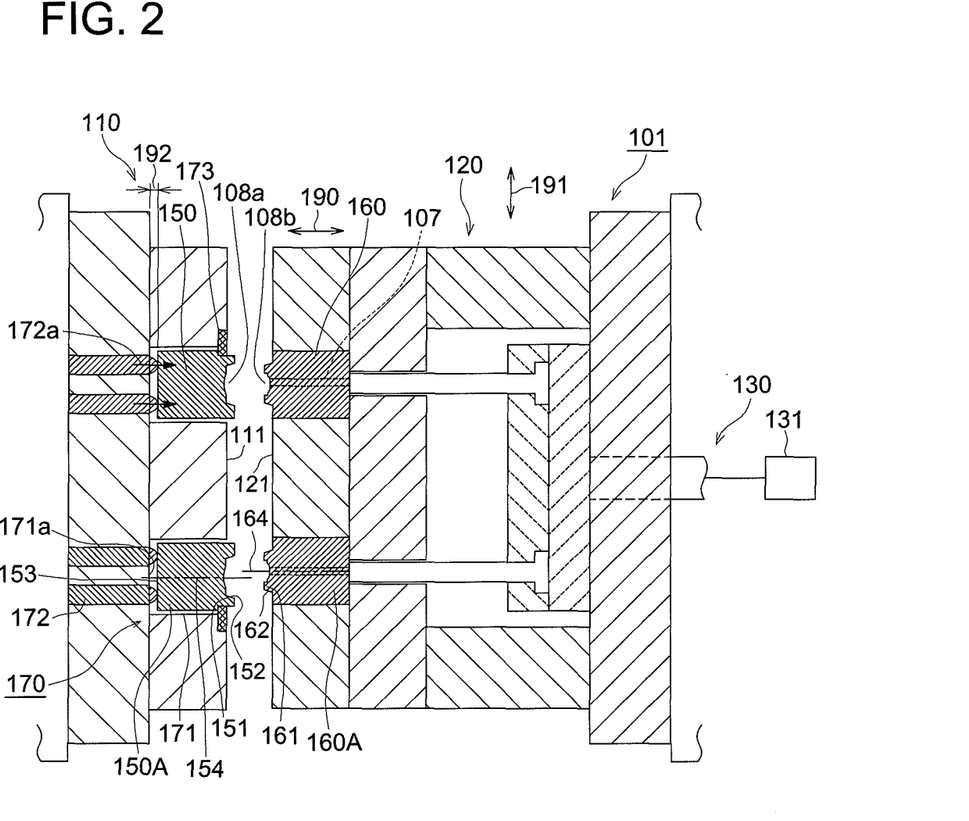
FIG. 2 is a diagram showing the die assembly for injection molding shown in FIG. 1 when the dice are released.

In addition, for clear understanding of an operation for correcting the axial misalignment in the die assembly for injection molding 101, for example, FIG. 2 shows the state where a central axis 154 of a first cavity-forming member 150A shown in the lower part of the drawing and a central axis 164 of a second cavity-forming member 160A which corresponds to the first cavity-forming member 150A do not conform to each other, in other words, the state of axial misalignment.

FIG. 2 shows a state where the first die 110 and the second die 120 are released. In this state, the first cavity-forming member 150 stored in the storage section 171 is urged, by the biasing forces 172a of the support members 170, against the facing second die 120, and is thus in contact with the dropout prevention members 173. Thus, the first cavity-forming member 150 is raised with respect to the bottom surface 171a of the storage section 171 with a gap 192 between them. Accordingly, the taper portion 151 of the first cavity-forming member 150 is protruded from the contact surface 111 of the first die 110. The gap 192 is a distance between the end face 153 of the first cavity-forming member 150 and the bottom surface 171a of the storage section 171. The contact surface 111 is a surface where the first die 110 comes into contact with the second die 120.

Figure 3:
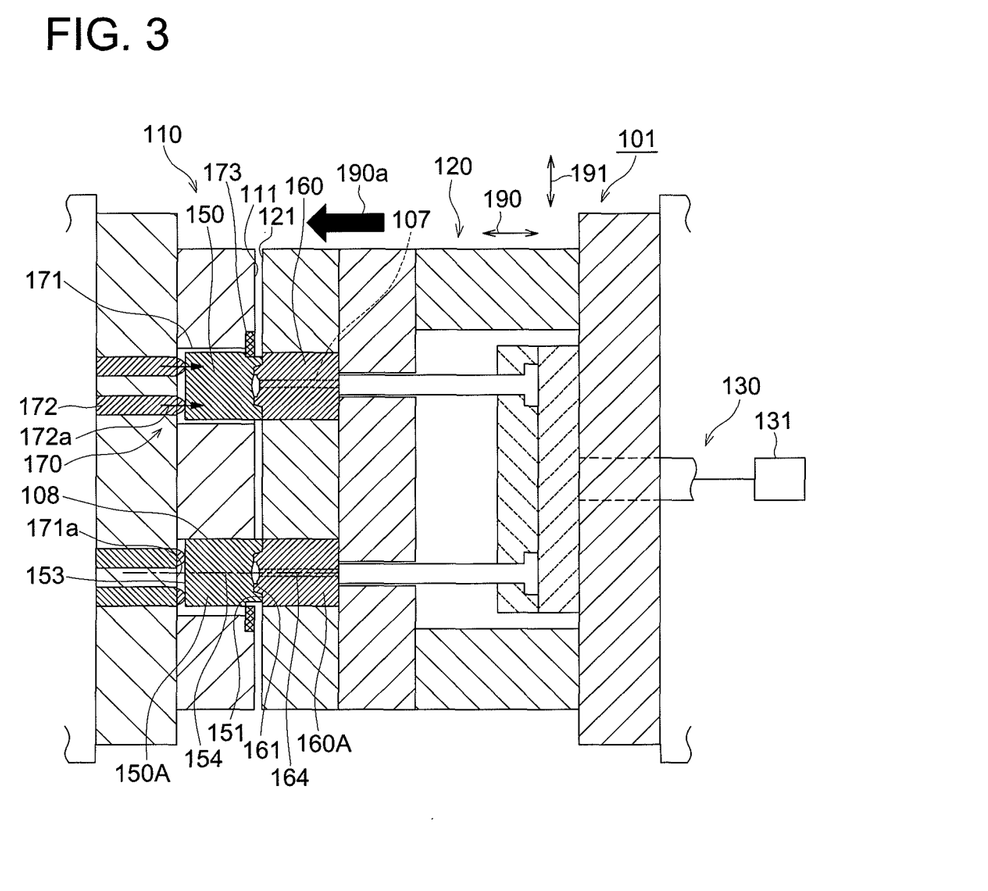
FIG. 3 is a diagram showing the die assembly for injection molding shown in FIG. 1 when die clamping is in operation.
Figure 4:
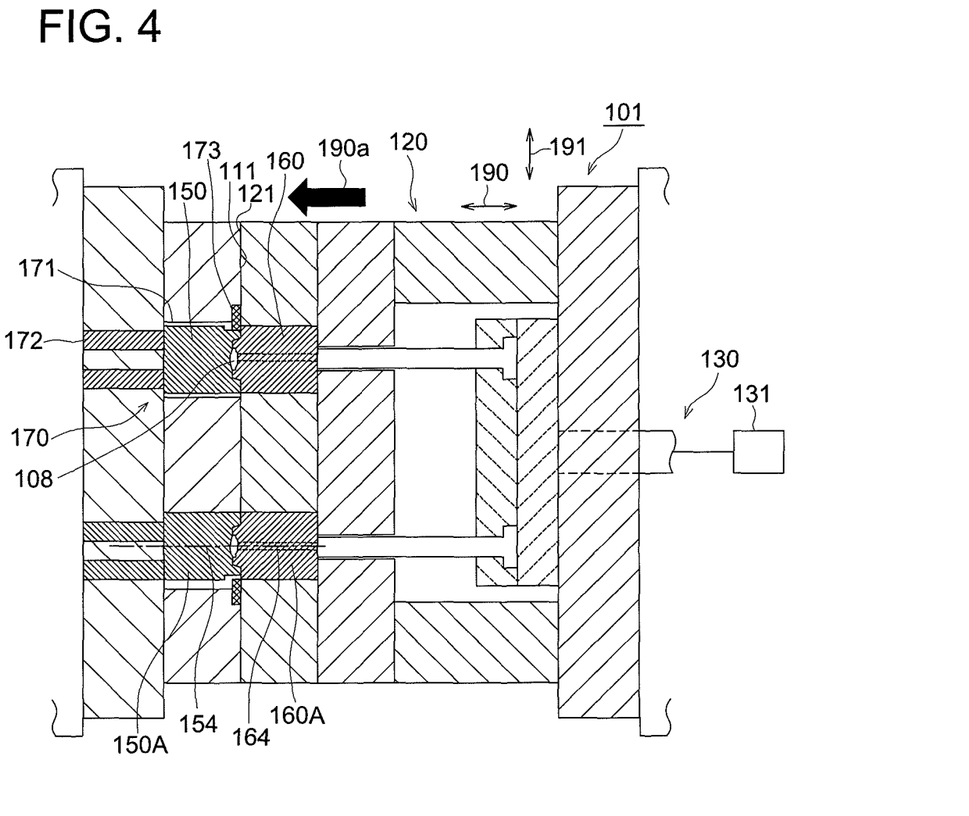
FIG. 4 is a diagram showing the die assembly for injection molding shown in FIG. 1 when the dice are clamped.

Next, the drive section 131 is operated to move the second die 120, which is the movable side die, in the clamping direction 190a of the open/close direction 190, as shown in FIG. 3. This movement brings the first cavity-forming members 150 and the second cavity-forming members 160, which form the cavities 108, into contact with each other. At this time, the taper surfaces 152 of the taper portions 151 of the first cavity-forming member 150 and the taper surfaces 162 of the taper portions 161 of the second cavity-forming member 160 are brought into contact with and engaged to each other.

Even in the case where there is an axial misalignment like in the case of the above-mentioned first cavity-forming member 150A and the second cavity-forming member 160A, the contact and engagement of the taper surfaces 152 of the first cavity-forming member 150A and the taper surfaces 162 of the second cavity-forming member 160A allows the first cavity-forming member 150A movably disposed in the storage section 171 to move following the above-mentioned engagement since, in this embodiment, the first cavity-forming member 150A corresponds to the above-mentioned movable cavity-forming member. Thus, as shown in FIG. 3, in this embodiment, the first cavity-forming member 150A moves to be arranged in place so that the central axis 154 of the first cavity-forming member 150A and the central axis 164 of the second cavity-forming member 160A are located on the same axis. As a result, the axial misalignment between the first cavity-forming member 150A and the second cavity-forming member 160A is eliminated.

As described above, in this embodiment, the axial misalignment can be corrected for each cavity 108 in the first cavity-forming member 150 and the second cavity-forming member 160 which form each cavity 108; therefore, the axial misalignment amount is reduced compared to before, in other words, the axial misalign accuracy is improved. In addition, the reproducibility of the axial misalignment is improved since the correction of the axial misalignment is preformed for every die clamping, and there is almost no need for a step for correcting the axial misalignment.

While the axial misalignment is being corrected, the second die 120 is further moved in the clamping direction 190a, the first cavity-forming member 150 supported by the support members 172 is moved in the storage section 171, against the biasing forces 172a of the support members 172, in the clamping direction 190a, and the end face 153 of the first cavity-forming member 150 and the bottom surface 171a of the storage section 171 come into contact with each other. That is, the above-mentioned gap 192 becomes zero. In addition, at the same time when the above-mentioned gap 192 becomes zero, the clamping is completed with the contact surface 121 of the second die 120 coming into contact with the contact surface 111 of the first die 110.

After the completion of the die clamping, molding material is injected from the material injection section 140 to the cavities 108 to mold components. In addition, a predetermined clamping force and molding temperature are applied, as known in the art, to the first die 110 and the second die 120 and the like during the die clamping.

After molding the components and after a cooling period, the dice are released by operating the drive section 131 to move the second die 120 in the die releasing direction. Along the die releasing, the first cavity-forming member 150 is moved again in the storage section 171 by the biasing forces 172a of the support members 172 until it comes into contact with the dropout prevention members 173.

The molded components are attached to the cavities 108 on the side of the second die 120, and are pushed out from the cavities 108 by the ejector pins 107 provided on the side of the second die 120, and are taken out.

Through the above-mentioned steps, the injection molding of components is completed.

The present invention is beneficial especially when optical elements such as lens are molded as in this embodiment, since the axial misalignment of each cavity is automatically corrected and reduced, and the axial misalignment of the components is thus reduced, thereby preventing the optical performances from being deteriorated.

In the die assembly for injection molding 101 of this embodiment, the first die 110, that is, a stationary side die, is provided with the above-mentioned "movable cavity-forming member" and the floating mechanism 170. The following is the reason for this arrangement. In a typical injection molding apparatus, the molded components are attached to the movable side die when the dice are released. Therefore, if the movable side die is provided with the "movable cavity-forming member" and the floating mechanism, there is a possibility for the molded components to be distorted. One reason is to reduce this possibility. In addition, since the movable side die has the die drive mechanism, a simple apparatus configuration is realized when the above-mentioned "movable cavity-forming member" and the floating mechanism 170 are provided rather on the stationary side die.

However, as long as an in order to realize an object of the present invention, the above-mentioned "movable cavity-forming member" and the floating mechanism can be provided on the movable side die or on both of the stationary side die and the movable side die as described above and shown in FIG. 5.

The support member 172 is a member which has a function to movably support, in the storage section 171, the above-mentioned movable cavity-forming member, which is stored in the storage section 171. Therefore, the support member 172 only has to have a structure to perform the abovementioned function, and the structure is not limited to the structure of the above-described bias member or the structure for supporting along the open/close direction 190. For example, an acceptable structure is one in which a member extending along the perpendicular direction 191, for example, supports the above-mentioned movable cavity-forming member in the storage section 171.

In order to smoothly move the above-mentioned "movable cavity-forming member" in the storage section 171 and surely arrange the central axis 154 of the first cavity-forming member 150 and the central axis 164 of the second cavity-forming member 160 on a straight line, the support member 172 is preferably provided as in this embodiment described above. However, the support member 172 does not have to be provided in some cases, depending on the shape and size of the molded components or molding accuracy or the like.

INDUSTRIAL APPLICABILITY

The present invention is applicable to a die assembly for injection molding.

DESCRIPTION OF THE NUMERALS 101, 102: Die assembly for injection molding
108: Cavity
110: First die
120: Second die
150: First cavity-forming member
151: Taper portion
160: Second cavity-forming member
161: Taper portion
170: Floating mechanism
171: Storage section
172: Support member
173: Dropout prevention member
190: Open/close direction
191: Perpendicular direction

The invention claimed is:

1. A die assembly for injection molding, comprising:
a first die and a second die which are configured to be moved in an open/close direction so as to form a cavity and mold a component in the cavity;
a pair of a first cavity-forming member and a second cavity-forming member which are configured to form the cavity; and
a floating mechanism provided on at least one of the first die and the second die,
wherein
the first cavity-forming member is disposed in the first die to form one side of the cavity;
a second cavity-forming member is disposed in the second die to form the other side of the cavity;
the first cavity-forming member and the second cavity-forming member each have a taper portion, the taper portions configured to be engaged with each other when die clamping of the first die and the second die is performed;
a die which is one of the first die and the second die and which has the floating mechanism is a floating-mechanism-equipped die;
a cavity-forming member which is one of the first cavity-forming member and the second cavity-forming member and which is disposed in the floating-mechanism-equipped die is a movable cavity-forming member; and
the floating mechanism movably holds the movable cavity-forming member and causes the movable cavity-forming member disposed in the floating-mechanism-equipped die to move such that the movable cavity-forming member follows an engagement of the taper portions when the die clamping is performed.

2. The die assembly of claim 1, wherein the floating mechanism includes:
a storage section configured to store the movable cavity-forming member to be movable in the open/close direction and in a perpendicular direction which is perpendicular to the open/close direction; and
a support member configured to support the movable cavity-forming member in the storage section to be in a movable state.

3. The die assembly of claim 2, wherein the support member is a bias member configured to bias the movable cavity-forming member in the open/close direction.

4. The die assembly of claim 2, wherein the floating-mechanism-equipped die further includes a dropout-prevention member configured to prevent the movable cavity-forming member from dropping off from the storage section.

5. The die assembly of claim 1, wherein the first die is either one of a stationary side die and a movable side die, the second die is the other one of the stationary side die and the movable side die, and only the stationary side die has the floating mechanism and the movable cavity-forming member.

6. The die assembly of claim 1, wherein the component molded in the cavity is a lens.

7. A die assembly for injection molding, comprising:
a first die and a second die which are configured to be moved in a clamping direction so that the first die and the second die move closer to each other, and configured to form a plurality of cavities for molding a component in each of the cavities;
a plurality of first cavity-forming members which are provided in the first die, each of the first cavity-forming members having a hollow portion to form one side of each of the cavities and having a first taper portion;
a plurality of second cavity-forming member which are provided in the second die such that the second cavity-forming members correspond one-to-one with the first cavity-forming members, each of the second cavity-forming members having a hollow portion to form the other side of each of the cavities and having a second taper portion, the first taper portion and the second taper portion engaging in each other when the first die and the second die are moved in the clamping direction; and
a plurality of floating mechanisms each of which is provided in the first die such that each of the floating mechanisms corresponds with each of the first cavity-forming members to movably support the each of the first cavity-forming members, and is configured to cause the each of the first cavity-forming members to move such that the first cavity-forming member follows an engagement of the first taper portion and the second taper portion when the first die and the second die are moved in the clamping direction.

* * * * *